United States Patent
Stauder et al.

(10) Patent No.: US 10,602,027 B2
(45) Date of Patent: Mar. 24, 2020

(54) COLOR GAMUT MAPPING USING A LIGHTNESS MAPPING BASED ALSO ON THE LIGHTNESS OF CUSP COLORS BELONGING TO DIFFERENT CONSTANT-HUE LEAVES

(71) Applicant: THOMSON Licensing, Issy-les-Moulineaux (FR)

(72) Inventors: Jurgen Stauder, Montreuil/Ille (FR); Erik Reinhard, Hédé-Bazouges (FR); Frederique Humbert, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 136 days.

(21) Appl. No.: 15/739,767

(22) PCT Filed: Jun. 10, 2016

(86) PCT No.: PCT/EP2016/063243
§ 371 (c)(1),
(2) Date: Dec. 25, 2017

(87) PCT Pub. No.: WO2016/206990
PCT Pub. Date: Dec. 29, 2016

(65) Prior Publication Data
US 2018/0191925 A1  Jul. 5, 2018

(30) Foreign Application Priority Data

Jun. 25, 2015 (EP) ..................................... 15306009

(51) Int. Cl.
*H04N 1/60* (2006.01)
*H04N 9/67* (2006.01)

(52) U.S. Cl.
CPC ......... *H04N 1/6058* (2013.01); *H04N 1/6005* (2013.01); *H04N 1/6075* (2013.01); *H04N 9/67* (2013.01)

(58) Field of Classification Search
CPC .. H04N 1/6058; H04N 1/6075; H04N 1/6005; H04N 9/67
See application file for complete search history.

(56) References Cited

U.S. PATENT DOCUMENTS

| | | | |
|---|---|---|---|
| 5,731,818 A * | 3/1998 | Wan ..................... | H04N 1/6058 345/590 |
| 6,995,865 B1 * | 2/2006 | Motomura ........... | H04N 1/6058 358/1.9 |

(Continued)

FOREIGN PATENT DOCUMENTS

| | | |
|---|---|---|
| CN | 102893610 | 1/2013 |
| EP | 2375719 | 10/2011 |
| WO | WO2011143117 | 11/2011 |

OTHER PUBLICATIONS

Cholewo et al., "Gamut boundary determination using alpha-shapes", 7th IS&T/SID Color and Imaging Conference, Scottsdale, Arizona, USA, Nov. 16, 1999, pp. 200-204.

(Continued)

*Primary Examiner* — Jon Chang
(74) *Attorney, Agent, or Firm* — Lily Neff (57) ABSTRACT

For the mapping in a non-linear color space of source colors belonging to a same constant-hue leaf, instead of using a lightness mapping function based only on a cusp lightness condition stating that a source cusp color of this leaf should be mapped into a corresponding target cusp color of this leaf, it is proposed to build such a function also on other source cusp color(s) and other target cusp color(s) having hues different from that of said leaf. Preferably, the hue interval in which these other colors are considered is representative (Continued)

of the curvature of the non-linear color space at the position of colors of this constant-hue leaf.

11 Claims, 5 Drawing Sheets

(56) References Cited

U.S. PATENT DOCUMENTS

| | | | |
|---|---|---|---|
| 2005/0248784 A1 | 11/2005 | Henley et al. | |
| 2005/0248785 A1* | 11/2005 | Henley | H04N 1/6058 358/1.9 |
| 2006/0170940 A1* | 8/2006 | Kang | H04N 1/6058 358/1.9 |
| 2007/0013928 A1* | 1/2007 | Kang | H04N 1/6058 358/1.9 |
| 2007/0236761 A1 | 10/2007 | Sloan | |
| 2008/0007806 A1 | 1/2008 | Shirasawa | |
| 2008/0080767 A1* | 4/2008 | Cho | H04N 1/6027 382/167 |
| 2012/0019843 A1 | 1/2012 | Kishimoto | |

OTHER PUBLICATIONS

Montag et al., "Psychophysical Evaluation of Gamut Mapping Techniques Using Simple Rendered Images and Artificial Gamut Boundaries", IEEE Transactions on Image Processing, vol. 6, No. 7, Jul. 1997, pp. 977-989.

Montag et al., "Gamut Mapping: Evaluation of Chroma Clipping Techniques for Three Destination Gamuts", IS&T/SID 6th Color and Imaging Conference, Scottsdale, Arizona, USA, Nov. 17, 1998, pp. 57-61.

Morovic et al., "Cross-Media Psychophysical Evaluation of Gamut Mapping Algorithms", AIC Association Internationale de la Couleur 97, Kyoto, Japan, May 25, 1997, pp. 594-597.

Morovic et al., "The Fundamentals of Gamut Mapping: A Survey ", Journal of Imaging Science and Technology, vol. 45, No. 3, May/Jun. 2001, pp. 283-290.

Rolleston, R., "Visualization of colorimetric calibration", Proceedings of SPIE, vol. 1912, Color Hard Copy and Graphic Arts II, Jun. 18, 1993, pp. 299-309.

Stauder et al., "Gamut Mapping for Motion Picture", 5th European Conference on Colour in Graphics, Imaging and Vision (CGIV 2010), Joensuu, Finland, Jun. 14, 2010, pp. 380-386.

Zolliker et al., "On the Continuity of Gamut Mapping Algorithms", Proceedings of SPIE, vol. 5667, Color Imaging X: Processing, Hardcopy, and Applications, Jan. 28, 2005, pp. 1-14

Stauder et al., "Motion Picture Versioning by Gamut Mapping", 18th Color and Imaging Conference, San Antonio, Texas, USA, Nov. 8, 2010, pp. 1-6.

* cited by examiner

COLOR GAMUT MAPPING USING A LIGHTNESS MAPPING BASED ALSO ON THE LIGHTNESS OF CUSP COLORS BELONGING TO DIFFERENT CONSTANT-HUE LEAVES

This application claims the benefit, under 35 U.S.C. § 365 of International Application PCT/EP2016/063243, filed Jun. 10, 2016, which was published in accordance with PCT Article 21(2) on Dec. 29, 2016, in English, and which claims the benefit of European Patent Application No. 15306009.0 filed Jun. 25, 2015.

TECHNICAL FIELD

The invention concerns a method for mapping colors of a source color gamut into a target color gamut that is adapted to the cusp colors of the source and target color gamut.

BACKGROUND ART

The aim of a color gamut mapping is to redistribute the source colors belonging to a source color gamut (for example the extended color gamut of a film) into a target color gamut (for example the color gamut of a standard television monitor). As the shape and boundaries of a target color gamut are generally different from those of the source color gamut, at least some of the target colors that are obtained after such a mapping are different from their corresponding source colors.

An application area of color gamut mapping is notably video content production and post-production. For example, an original version of a video content need to be converted into specific versions adapted for different types of reproduction or transmission: for example, a specific version for cinema, another for television, and a third one for internet. These different versions can be prepared by manual color correction or/and by application of gamut and tone mapping algorithms.

Among the requirements for color gamut mapping are notably:
 preservation of color neighborhood and order, absence of color banding and false contours, in order, notably, to prevent from incoherent reproduction of grey and color ramps;
 continuity of color and absence of visible quantization or clipping errors, in order, notably, to prevent from banding and false contours;
 separate control for lightness, hue and saturation for keeping the full artistic control on how colors are modified, and for allowing the formulation of a higher, semantic level of artistic intents.

In order to define a color gamut mapping, a gamut boundary description (GBD) of the source color gamut and of the target color gamut is generally used. Such a GBD of a color gamut defines the boundary surface of this color gamut in a color space. GBDs comprise generally explicit, generic 3D representations such as triangle meshes or volume models. For instance, a GBD of a color gamut can be based on a mesh of triangles, each triangle being defined by its three vertices in the color space of this GBD. These vertices are colors located on the boundary of the color gamut.

Figure 1:
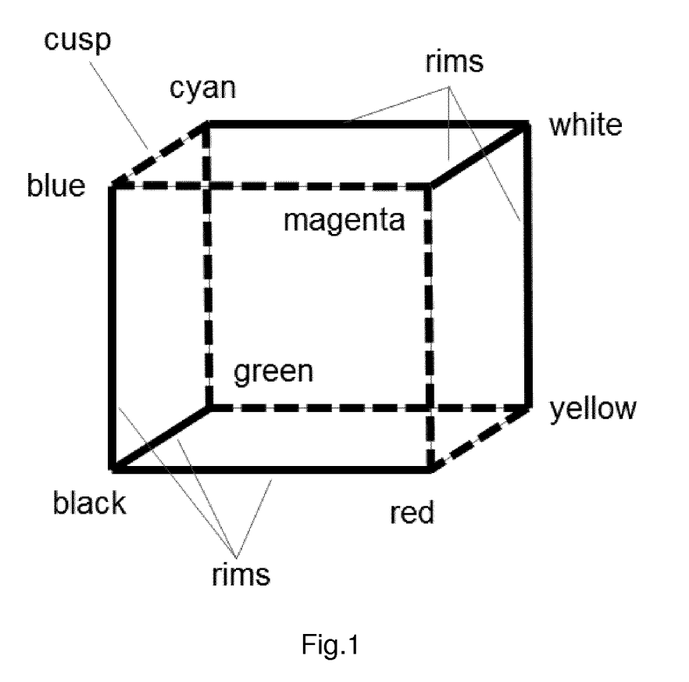
FIG. 1 illustrates the cusp line and the rims of a color gamut in a RGB color space.

As illustrated by dotted lines on FIG. 1 in a RGB color space, in case of a color gamut of a trichromatic display or a trichromatic camera, cusp lines usually correspond to singular lines ("edges") linking each primary color of this display or camera with a secondary color having this primary color as a component, namely a singular line linking: red with yellow, red with magenta, green with yellow, green with cyan, blue with cyan and blue with magenta. The "cusp line" of a color gamut is a line joining cusp colors. When the color gamut is represented in a color space having a measure for chroma such as Lab or JCh color space, a cusp color is a color of maximum Chroma (i.e. maximum saturation) in a plane defined by a constant hue in this color space. In Lab color space for example, chroma is defined to be the square root of the sum of the squares of a and b, respectively. A plane defined by a constant hue is generally named "constant hue leaf". More generally, cusp colors correspond to singular points ("vertices") or singular lines ("edges") on the boundary surface that limits a color gamut. The cusp line of a color gamut can be generally modeled as a line forming a closed polygon on the gamut boundary of this color gamut.

As illustrated by solid lines on FIG. 1, "rims" of a color gamut correspond to the high-lightness ridges of this color gamut linking the white point of this color gamut to the secondary colors and to the low-lightness ridges linking the black point of this color gamut to the primary colors. For example, a yellow rim of a color gamut starts at the white point and ends at the yellow secondary color. The colors on this yellow rim include white, yellowish whites, pales yellows, saturated yellows and finally the yellow secondary color itself. Such as the cusp line of a color gamut, also the rims of a color gamut include generally singular points, that correspond generally to non-continues curvature of the gamut boundary of the color gamut.

On FIG. 1, cusp lines (dotted lines) and rims (solid lines) of the color gamut are by definition straight lines, because these lines are represented in the RGB color space defined by the device having those primary and secondary colors. The same lines are generally not straight when represented for instance in a Lab color space.

When trying to define a method of color gamut mapping (or algorithm: "GMA") source colors inside a source color gamut (having its own source cusp line and source rims) into target colors such they are located inside a target color gamut (having its own target cusp line and target rims), in order to take advantage of the whole range of colors in the target color gamut, it is known to define the GMA according different conditions among which the following cusp mapping condition: any source cusp color should be mapped into a target cusp color. Such color mapping methods are known as "cusp color gamut mapping".

US2007/236761 discloses a mapping method using the cusp colors of a color gamut. Cusp colors are interpolated from primary and secondary colors of the color gamut. In the disclosed method, a color ([0104] "point A") is mapped (([0104] 'chroma dependent lightness mapping") to a mapped color ([0104] "point B"). The mapped color has a lightness that is closer to the lightness of a cusp point of the constant-hue leaf of the color to map ([0104] "lightness compression toward primary cusp point"). This cusp point is that of a target gamut and is identical to the cusp point of a source gamut of the same hue leaf (FIG. 12b: "both cusp points") after a cusp point mapping in this constant-hue leaf ([0059] "the source primary cusp point is mapped to the destination primary cusp point") and after mapping of black and white points of the source gamut to the black and white points, respectively, of the target gamut (FIG. 11: "lightness rescaling"). The lightness mapping depends on the unique black point, the unique white point and the unique cusp point in the constant-hue leaf in which the mapping is performed.

A drawback of the color mapping method disclosed in US20070236761 is to be based on a unique cusp point and not at least on two different points, those of source and target color gamuts.

US2005/248784 discloses a color gamut mapping method called shear mapping that maps in a constant-hue LC leaf the cusp of the source gamut to the cusp of the target gamut. However, after the shear mapping, other colors that the cusp colors may still lie outside of the target color gamut. For such a situation, US2005/248784 discloses to further map colors that lie outside the target color gamut to the closest colors of the target color gamut, see FIG. 10 of US2005/248784. The document EP2375719 discloses also such an additional mapping step.

Figure 2:
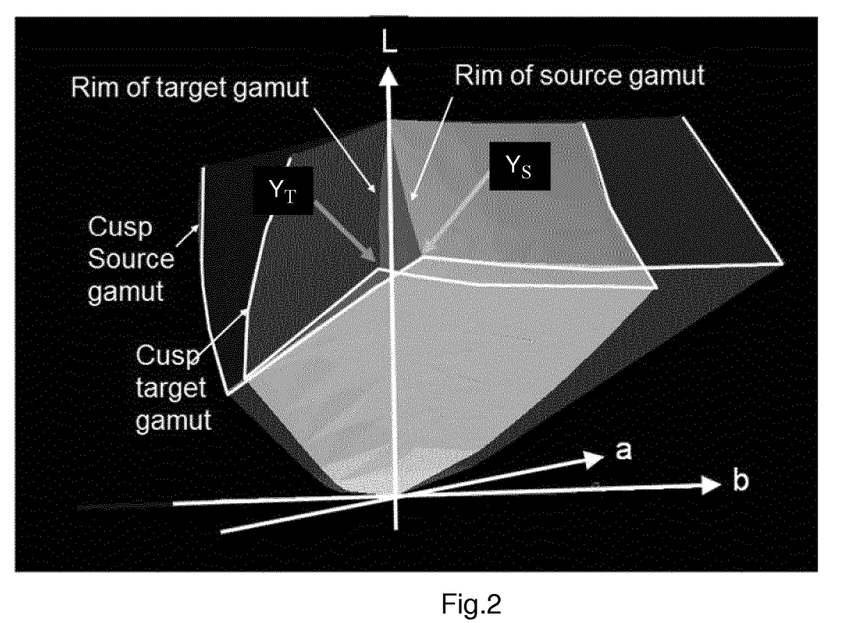
FIG. 2 illustrates a source color gamut and a target color gamut in the Lab color space.

As a whole, the main drawback of all known cusp color gamut mapping methods operating within a constant-hue leaf is the mismatch between a generally linear propagation of the mapping of the cusp colors that is generally used for the definition of a mapping function for other colors of this leaf and the non-plane boundaries (i.e. the curvature) of the source and target color gamuts in the color space in which the mapping is performed, for example the Lab color space. The curvature of the source and target color gamuts is due to the curvature or non-linearity of this color space. For example, in FIG. 1 a color gamut is shown in a RGB space in which it is not curved. In FIG. 2, such color gamuts are shown in CIELab space in which they are now curved. The curvature of a color gamut generally reflects the curvature of the color space in which this color gamut is represented. FIG. 2 represents a source color gamut and a target color gamut in the 3D CIELAB color space. A constant-hue leaf of this color space usually includes the L axis. The white lines shown on this figure are the cusp line of the source gamut and of the target gamut. Some segments of these cusp lines are not straight. Some segments of the rims of the source and target gamut are indicated by white arrows. Those segments are not straight too. As an example, we will consider two specific constant-hue leaves on this figure: a first leaf including the L axis and the source cusp color located at the intersection $Y_S$ of the cusp line of the source gamut with the segment of the rim of the source color gamut which is indicated by an arrow, and a second leaf including the L axis too and the target cusp color $Y_T$ located at the intersection of the cusp line of the target gamut with the segment of the rim of the target color gamut which is indicated by another arrow. Within each of these first and second constant-hue leaves, known definition of usual cusp gamut mapping functions to be applied to any source color of this leaf are based on a linear propagation (or in a proportional manner) of the cusp mapping rule(s) fixed specifically for the mapping of cusp colors in this constant-hue leaf. But, as shown on FIG. 2, the indicated segment of the rim of the source color gamut as well as the indicated segment of the rim of the target color gamuts are generally not straight lines in the color space in which the mapping is performed. In fact, generally, the whole boundary of any of the color gamuts, including cusp lines and rims become curved by the non-linearity of the mapping color space, here the Lab color space. In consequence, the rims and cusp lines of a color gamut are generally not included in a single constant-hue leaf but pass through different constant-hue leafs. Therefore, when the definition of a gamut mapping function to be applied to source colors of a constant-hue leaf is based on a linear propagation (or in a proportional manner) of such cusp mapping rule(s), this definition does not take into account the position of cusp colors located out of this constant-hue leaf, notably does not take into account the curvature of the cusp lines and of the rims around this constant-hue leaf. It means that, in fact, the color mapping that is appropriate for a source cusp color in a constant-hue leaf may not be appropriate for another source color of this constant-hue leaf. For example, for a source color lying directly on a segment of a rim of the source color gamut, there may be a mismatch between the non-linear geometrical properties of this segment of rim—being a ridge of the gamut—and the linear association of the mapping function used to map this source color with the mapping of the cusp color of the same constant-hue leaf, when this cusp color does not belong to this rim and therefore does not have the geometrical properties of this rim. These two different colors—i.e. the source color belonging to the rim and the cusp color—would better need different color mapping rules. In other words, when propagated linearly by a shearing operation such as in US2005/248784, lightness information obtained from the cusp colors may be inappropriate to map colors belonging to regions farther away from the cusp line.

SUMMARY OF INVENTION

An object of the invention is to avoid the aforementioned drawbacks.

For this purpose, a subject of the invention is a method of color gamut mapping source colors into targets colors from a source color gamut towards a target color gamut in a 3D non-linear gamut mapping color space that can be partitioned in 2D constant-hue leaves having axes for lightness and chroma, wherein a source cusp color of a constant-hue leaf is defined as a color having the highest color chroma in said constant-hue leaf and in said source color gamut, wherein a target cusp color of a constant-hue leaf is defined as a color having the highest color chroma in said constant-hue leaf and in said target color gamut, said method comprising mapping the lightness L of each source color having a chroma C into a lightness L' of a target color according to a lightness mapping function L'=ƒ(C,L) associated with the constant-hue leaf comprising said source color, wherein said lightness mapping function is defined such as to meet a cusp lightness condition according to $f(C_C^{SOURCE}, L_C^{SOURCE}) = L_C^{TARGET}$, where $L_C^{SOURCE}$ and $C_C^{SOURCE}$ are respectively the lightness and the chroma of the source cusp color of this leaf, where $L_C^{TARGET}$ is the lightness of the target cusp color of this leaf, wherein there is at least one lightness mapping function associated with a leaf of constant hue h which depends not only on the lightness of the source cusp color of said leaf and on the lightness of the target cusp color of said leaf but also on the lightness of at least one other source cusp color and/or on the lightness of at least one other target cusp color of constant-hue leave(s) different from said leaf of constant hue h.

Preferably, said at least one lightness mapping function L'=ƒ(C,L) associated with the constant-hue leaf of hue h depends on a source average of lightnesses of these source cusp colors and/or on a target average of lightnesses of these target cusp colors. These source cusp colors are the source cusp color having a lightness $L_C^{SOURCE}$ and/or the at least one other source cusp color of constant-hue leave(s) different from said leaf of constant hue h. When there are more than one other source cusp color of constant-hue leave(s) different from said leaf of constant hue h, the average can be computed only on lightnesses of these other source cusp colors. These target cusp colors are the target cusp color having a lightness $L_C^{TARGET}$ and/or the at least one other target cusp color of constant-hue leave(s) different from said leaf of constant hue h. When there are more than one other target cusp color of constant-hue leave(s) different from said leaf of constant hue h, the average can be computed only on lightnesses of these other target cusp colors.

Preferably, source cusp colors of different constant-hue leaves forming a polygon representing a source cusp line, source cusp colors of said source average includes vertices of said polygon which are the nearest from the intersection of said source cusp line with the leaf of constant hue h. Preferably, said source average is computed over the two nearest source cusp colors around the intersection of the leaf of constant hue h with the source cusp line.

Preferably, target cusp colors of different constant-hue leaves forming a polygon representing a target cusp line, target cusp colors of said target average includes vertices of said polygon which are the nearest from the intersection of said target cusp line with the leaf of constant hue h. Preferably, said target average is computed over the two nearest target cusp colors around the intersection of the leaf of constant hue h with the target cusp line.

Preferably, hue(s) of said at least one other source cusp color(s) are distributed over a source hue interval $[h-(1-t)\Delta h^{SOURCE}, h+(1-t)\Delta h^{SOURCE}]$, j wherein h is the hue of said leaf of constant hue, wherein $\Delta h^{SOURCE}$ is a source hue interval around said constant hue h which is representative of the curvature of said mapping color space in hue direction at the position of colors of said source color gamut lying in the leaf of said constant hue h, where t is a positive lightness weight inferior or equal to 1.

Preferably, hue(s) of said at least one other target cusp color(s) are distributed over a target hue interval $[h-(1-t)\Delta h^{TARGET}, h+(1-t)\Delta h^{TARGET}]$, where h is the hue of said leaf of constant hue, where $\Delta h^{TARGET}$ is a target hue interval around said constant hue h which is representative of the curvature of said mapping color space in hue direction at the position of colors of said target color gamut lying in the leaf of said constant hue h, where t is a positive lightness weight inferior or equal to 1.

In summary, for the mapping in a non-linear color space of source colors belonging to a same constant-hue leaf, instead of using a lightness mapping function based only on a cusp lightness condition stating that a source cusp color of this leaf should be mapped into a corresponding target cusp color of this leaf, it is proposed to build such a function also on other source cusp color(s) and other target cusp color(s) having hues different from that of said leaf. Preferably, the hue interval in which these other colors are considered is representative of the curvature of the non-linear color space at the position of colors of this constant-hue leaf Preferably, said at least one lightness mapping function depends on a parameter t representative of the difference between the lightness L of the source color to map and the lightness of the black point of the source color gamut, or between the lightness L of the source color to map and the lightness of the white point of the source color gamut.

Preferably, said at least one lightness mapping function depends on a parameter u representative of the ratio between the chroma C of the source color to map and the chroma of said source cusp color of the leaf of said constant hue h.

A subject of the invention is also an image processing device for mapping source colors of a content which are provided in a source color gamut having a black point and a white point into targets colors of a target color gamut, in a 3D non-linear gamut mapping color space that can be partitioned in 2D constant-hue leaves having axes for lightness and chroma, comprising:

a cusp module configured to obtain, from said source color gamut, source cusp colors forming a polygon describing a source cusp line and, from said target color gamut, target cusp colors forming a polygon describing a target cusp line, a hue interval module configured to obtain, for any leaf of constant hue in which there is at least one source color to map, a source hue interval around the hue h of this leaf associated with the source cusp color of this leaf provided by said cusp module, and a target hue interval around the hue h of said leaf associated with the target cusp color of this leaf provided by said cusp module, a lightness-mapping function definition module configured to define, for source colors located in a same leaf of constant-hue h, a lightness-mapping function $f(C,L)$ adapted to lightness-map any of these source colors having a chroma C and a lightness L, wherein said lightness mapping function depends not only on the source cusp color and on the target cusp color of said leaf of constant-hue h but also on at least one other source cusp color and on at least one other target cusp color of constant-hue leave(s) different from leaf of constant-hue h, wherein hue(s) of said at least one other source cusp color are distributed over the source hue interval provided by said hue interval module, and wherein hue(s) of said at least one other target cusp color are distributed over the target hue interval provided by said hue interval module, a lightness-mapping module configured to apply the lightness-mapping function $f(C,L)$ provided by the lightness-mapping function definition module to said source colors located in said leaf of constant-hue h such as to output lightness-mapped colors.

A subject of the invention is also an electronic device incorporating this image processing device, such as such as a TV set, a set-top-box, a gateway, a tablet, a smartphone, a camera or any electronic device incorporating an image display device and/or an image capture device.

A subject of the invention is also a processor readable medium having stored therein instructions for causing a processor to perform the above method of color gamut mapping, and a computer-readable program comprising computer-executable instructions to enable a computer to perform the above method of color gamut mapping.

The cusp-oriented color gamut mapping method according to the invention is notably applicable to professional color processing software, when the colorist needs to be free to choose any chroma variations.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 3:
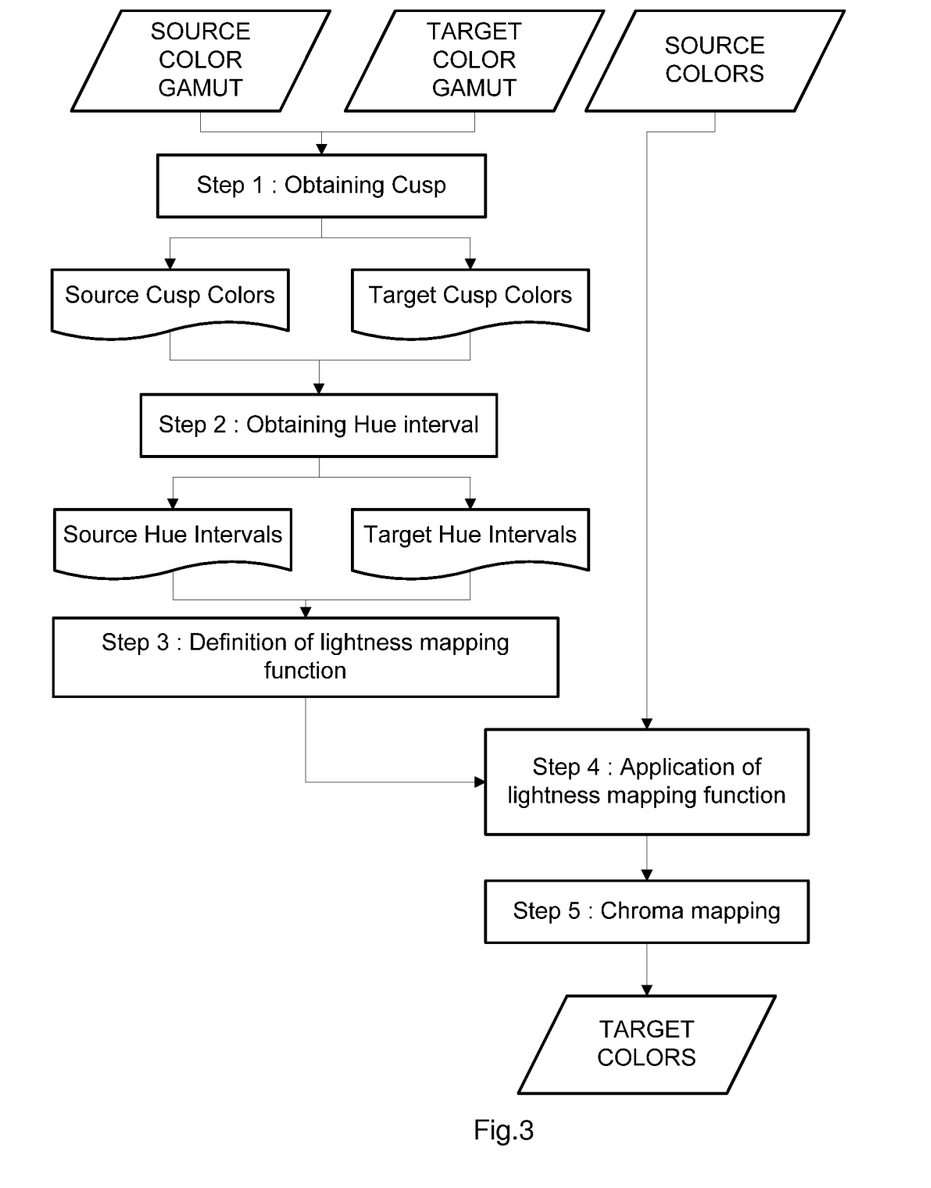
FIG. 3 is a diagram illustrating an embodiment of a color gamut mapping method according to the invention.

The functions of the various elements shown in the figures, notably FIG. 3, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

A specific embodiment of the cusp color gamut mapping method according to the invention will now be described in reference to FIG. 3.

As mapping color space, the CIE 1976 Lab color space is chosen. A Lab color space is a color-opponent space that is perceptually uniform, with dimension L for lightness and a and b for the color-opponent dimensions. The red/green opponent primary colors are represented along the a axis, with green at negative a values and red at positive a values. The yellow/blue opponent secondary/primary colors are represented along the b axis, with blue at negative b values and yellow at positive b values.

In this color space, colors can also be represented by polar coordinates, i.e. in a LCh mode, with L for the same lightness, the hue angle h according to $$h = \begin{cases} \text{atan}(b/a) & a > 0 \land b > 0 \\ \pi/2 - \text{atan}(a/b) & a \leq 0 \land b > 0 \\ 3\pi/2 - \text{atan}(a/b) & a > 0 \land b \leq 0 \\ \pi + \text{atan}(b/a) & a \leq 0 \land b \leq 0 \end{cases}$$

i.e. the angle between the vector having a, b as coordinates and the a-axis, $C=\sqrt{a^2+b^2}$ corresponding to the chroma, i.e. the saturation of the color. The higher the C value the more saturated is the color. The hue angle may be also named $\alpha_H$.

Other color spaces such as the appearance-based space JCh according to CIECAM-02 can be used for the mapping. Furthermore, the below embodiment concerns a hue-preserving cusp color gamut mapping. This means that the color mapping is not actually carried out in three dimensions in Lab space but in two dimensions in a constant-hue leaf of the Lab space, i.e. in a 2D LC color space. The hue defining the constant-hue leaf in which the color mapping is to be performed is chosen to be the hue of the source color to be mapped.

The source GBD used to describe the source color gamut comprising source colors to map is based in a manner known per se on a mesh of triangles, each triangle being defined by the position of its three vertices in the mapping color space, these vertices being source colors located on the boundary of the color gamut. The source color gamut can correspond to a specific or standard display device such as a LCD or an OLED panel, to a specific content to map, to an image capture device such as a camera or a scanner, or to any other color device.

The target GBD used to describe the target color gamut in which source colors are to be mapped is also based in a manner known per se on a mesh of triangles, each triangle being also defined by the position of its three vertices in the mapping color space, these vertices being target colors located on the boundary of the color gamut. The target color gamut can correspond for instance to a specific or standard display device or to a printer.

Gamut Boundary Descriptions can be convex or non-convex, but in the embodiment below, it is assumed that source and target GBDs are both approximately convex.

Furthermore, as illustrated on FIG. 3, the primary colors, the secondary colors, the black point and the white point of the two color gamuts are supposed to be known.

$1^{st}$ Step: Obtaining CUSP Colors of the Source and Target Color Gamuts:

The cusp line of each color gamut is defined by a line joining all cusp colors of this color gamut, whereas each cusp color is defined to be the color within this color gamut with the highest color saturation C compared to all other colors in the constant-hue leaf having the same hue h as this cusp color. Using GBDs based on triangles represented by their vertices as defined above, the cusp line of a color gamut is then described by a series of vertices of these triangles that meet this highest color saturation requirement. The vertices of this series then form a closed polygon that circumscribes in a certain manner the gamut boundary description.

In the implementation described below, the same method of obtaining the cusp colors is used for the source color gamut and for the target color gamut, namely the method described by Stauder et. al. in their article entitled "Gamut Mapping for Motion Picture" published at the Conference on Colour in Graphics, Imaging and Vision, Jun. 14-18, 2010. In order to obtain the cusp line of each of the source and target color gamuts from their GBDs, the following steps described in this article are implemented:

1. Detection of a first current cusp vertex as the vertex of the gamut boundary description (GBD) having the highest color saturation C;

2. For each of neighboring vertices of this GBD located in the neighborhood of this current cusp vertex, calculation of the value of a quality criterion (example of a definition is given further down), said neighborhood being defined by all vertices that are linked to the current cusp vertex by an edge of a triangle of this GBD;

3. From these neighboring vertices, selection of the vertex of the neighborhood having the highest value of this quality criterion as being a cusp color of the cusp line, 4. If this selected vertex satisfies a stop criterion (example of a definition is given further down), the whole cusp line of this color gamut is considered as obtained; if the stop criterion is not satisfied, the selected vertex is overtaken as current cusp vertex and steps 2 to 4 above are reiterated up to a last selected vertex satisfies the stop criterion.

From the first current cusp vertex up to the last selected vertex of iterations of the above steps, a series of cusp vertices defining cusp colors is then obtained, said series forming a closed polygon that circumscribes in a certain manner the color gamut and describes the cusp line of the color gamut.

Figure 4:
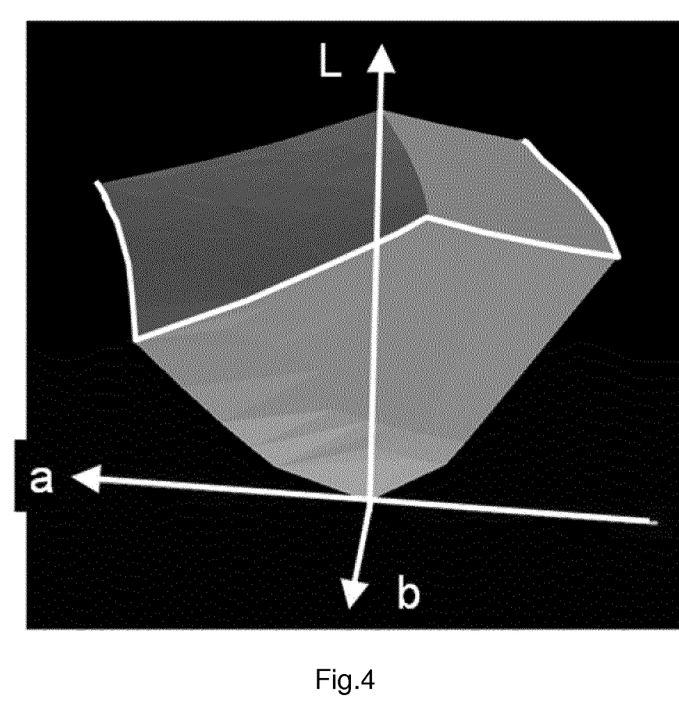
FIG. 4 illustrates the cusp line and the rims of a color gamut in a Lab color space.

The white line which forms a polygon on FIG. 4 (partially shown) describes the cusp line of the color gamut shown on this figure that is obtained through the above method. The color gamut is that of an ideal color-additive display device.

Still in reference to the article from Stauder et al. already quoted above, an example of definition of a quality criterion K will now be given, based on a combination of four sub criteria, which are: a saturation criterion $K_S$, a lightness similarity criterion $K_I$, a hue angle increase criterion $K_H$, and a collinearity criterion $K_D$.

The saturation criterion $K_S$ is defined such as to find the most saturated cusp vertices of a neighborhood. The value of the saturation criterion $K_S$ of a vertex V belonging to the neighborhood of a current cusp vertex $\hat{V}$ is defined as follows:

$$K_S = \frac{C(1+D/c_2)}{c_1}$$

where $V = \begin{pmatrix} L \\ a \\ b \end{pmatrix}, \hat{V} = \begin{pmatrix} \hat{L} \\ \hat{a} \\ \hat{b} \end{pmatrix}$, where $D=|V-\hat{V}|=\sqrt{(L-\hat{L})^2+(a-\hat{a})^2+(b-\hat{b})^2}$ is the distance, in the Lab color space, between the neighboring vertex V and the current cusp vertex $\hat{V}$, and where the values for the constant coefficients $c_1$, $c_2$ can be for instance $c_1=150$ and $c_2=50$.

The lightness similarity criterion $K_I$ is defined such as to find cusp vertices of a neighborhood having a similar lightness L along the cusp line. The value of the lightness similarity criterion $K_I$ of a vertex V belonging to the neighborhood of a current cusp vertex $\hat{V}$ is based on the difference between the lightness of the neighboring vertex L and that of the current vertex $\hat{L}$ and is defined as follows:

$$K_I = 1 - \frac{(L-\hat{L})^2}{(c_3)^2}(1+D/c_2),$$

where the value for the constant coefficient $c_3$ may be for instance $c_3=100$.

The hue angle increase criterion $K_H$ is defined such as to find cusp vertices of a neighborhood that increase in hue angle, in order to get a cusp line description formed by a closed and smooth cusp polygon. The value of the hue angle increase criterion $K_H$ of a vertex V belonging to the neighborhood of a current cusp vertex $\hat{V}$ is defined as follows:

$$K_H = \frac{\alpha_H - \hat{\alpha}_H}{c_4}$$

where $\alpha_H$ is the hue angle of the vertex V as defined above (also named h), where $\hat{\alpha}_H$ is the hue angle of the vertex V that is defined in the same manner as $\alpha_H$ while using the coordinates $\hat{a}$, $\hat{b}$ instead of a,b, respectively, where the value for the constant coefficient $c_4$ can be for instance $c_4=90$.

The collinearity criterion $K_D$ is defined such as to find cusp vertices of a neighborhood in a direction as close as possible to the direction of the previous iteration of the method as defined above to obtain the cusp line, in order to still improve the smoothness of the cusp polygon. The value of the collinearity criterion $K_D$ of a vertex V belonging to the neighborhood of a current cusp vertex V which has been itself selected in a previous iteration in the neighborhood of a previous current cusp vertex V''' is defined for instance as follows:

$$K_D=1-\alpha_D/c_5$$

where $\alpha_D=\angle\{d;\hat{d}\}$, i.e. the angle between a first direction vector $\hat{d}=\hat{V}-V'''$ and a second direction vector $d=V-\hat{V}$, and where the value for the constant coefficient $c_5$ can be for instance $c_5=90$.

The value of the quality criterion K of a vertex V belonging to the neighborhood of a current cusp vertex $\hat{V}$ is then calculated for instance according to the formula:

$$K=c_S K_S+c_H K_H+c_I K_I+c_D K_D+c_C K_C,$$

where the value for the weight coefficient s are for instance $c_S=5$, $c_H=5$, $c_I=2$ and $c_D=2$.

Still in reference to the article from Stauder et al. already quoted above, an example of definition of a stop criterion to be applied to a selected vertex will now be given as follows:

Either, the selected vertex is identical with the current cusp vertex;

Or the selected vertex has an associated hue angle $\alpha_H$ that is larger than the hue angle of this current cusp vertex augmented by 360 degrees.

$2^{nd}$ Step: Estimation of Hue Intervals for Cusp Colors of the Source and Target Color Gamuts:

As already explained above, changing the color space in which a color gamut is represented may infer curvatures, notably changing from a linear RGB color space to the non-linear Lab color space but also when changing from non-linear RGB color space to the non-linear Lab color space. Curvature occurs as soon as the mathematical functions used to transform RGB color coordinates into Lab coordinates are non-linear. More precisely, a group of colors that are distributed along a straight line in the RGB color space are generally distributed along a non-straight curved line in the Lab color space. In this Lab color space, at any color of this curved line, a curvature of this curved line can be computed. Such a curvature reflects the curvature induced by the change of color space. An aim of this $2^{nd}$ step is to take into account the curvature, notably in hue direction, of the gamut mapping color space, here the Lab color space.

When a color gamut is represented by a cube in a RGB color space, all colors within this color gamut which are distributed along a straight line in this color space will be distributed along a curved line in the Lab color space. Therefore, the curvature of this curved line at the location of a given color may be represented by the tangent vector of this curved line (i.e. derivation of the curve) at this given color. Hue component (i.e. hue angle) of this tangent vector is representative of the curvature of this curved line in hue direction at the location of this given color. This hue component may be named "hue derivation".

An aim of this $2^{nd}$ step is to get an average representation of the curvature in hue-direction at the location of colors belonging to a same constant-hue leaf. A straight line of colors should be defined in the RGB color space comprising a given color at which this curvature has to be estimated such that the corresponding curved line in the Lab color space intersects a constant-hue leaf comprising this given color. The curvature of this curved line in hue direction at this position—named below "hue derivation"—corresponds to the curvature of the Lab space at this position. An aim of this $2^{nd}$ step is to estimate at least one representative value of these curvatures over the different colors of this constant-hue leaf. In other words, an aim of this $2^{nd}$ step is to estimate at least one "hue derivation" or "hue interval" that is representative of these curvatures. As a constant-hue leaf of hue h can be characterized by its source and/or target cusp color—i.e. intersection of this leaf with the source and/or target cusp line, a source hue interval $\Delta h^{SOURCE}$ around this hue h can be defined in association with this source cusp color, and a target hue interval $\Delta h^{TARGET}$ around the hue h can be defined in association with this target cusp color. The source hue interval $\Delta h^{SOURCE}$ is representative of the curvatures of the Lab color space in hue direction over the different colors of the source color gamut lying in the same constant-hue leaf, and the target hue interval $\Delta h^{TARGET}$ is representative of the curvatures of the Lab color space in hue direction over the different colors of the target color gamut lying in the same constant-hue leaf.

In the first to fourth sub-steps below, a computation of such "hue intervals" $\Delta h^{SOURCE}$ and $\Delta h^{TARGET}$ associated with any cusp color defining a constant-hue leaf is described.

Although the invention is preferably implemented with "hue intervals" representative of the curvatures of the mapping color space as described above, the invention may also be implemented using "hue intervals" which are not representative of theses curvatures: see below.

For this description of the computation, it is reminded that the rims of a color gamut are defined by high-lightness lines linking the white point of this color gamut to its secondary colors, and by low-lightness lines linking the black point of this color gamut to its primary colors. As this color gamut is described by a mesh of triangles (see above), rims are represented by series of rim colors, as already mentioned for the cusp lines above.

Figure 5:
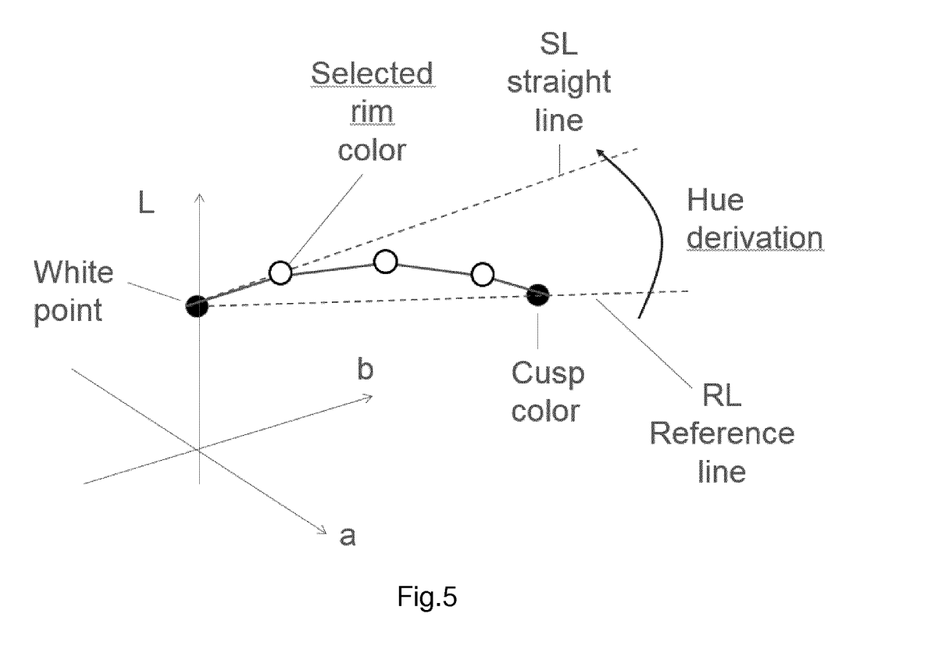
FIG. 5 illustrates how to obtain a source or target hue interval according to the embodiment illustrated on FIG. 3.

In a first sub-step of computation, at the position of each of the source cusp colors that are secondary colors, i.e. located at the intersection of a high-lightness rim with the cusp line, a high-lightness source hue interval is defined in reference to FIG. 5 as follows: a reference line RL being defined as the straight line linking the white point to this secondary color—shown as "cusp color" on FIG. 5, a rim color is selected on the rim of the source color gamut that links the white point to this secondary color—shown as a solid curved line on FIG. 5—such that the straight line SL between the white point and this selected rim color has the largest hue difference (i.e. hue angle difference) compared to the reference line RL. The hue difference between those two lines SL and RL corresponds to the projection of the angle between these two lines on the a-b plane. Note that an alternative implementation can be to select on this rim a rim color that has the largest distance in terms of L,a,b coordinates from the reference line RL. This largest hue difference or largest distance is taken as the high-lightness source hue interval at the position of the secondary color.

In a first variant of implementation of this first sub-step, a triangle is defined between the white point, the secondary color and a third color located on the source cusp line such that this triangle has the same surface as the surface delimited by the straight line linking the white point and the secondary color and by the rim. This defined triangle is projected on an ab-plane of constant lightness. The hue angle at the vertex of the projected triangle which is located on the lightness axis is then considered as the high-lightness hue interval associated with the cusp secondary color.

Figure 6:
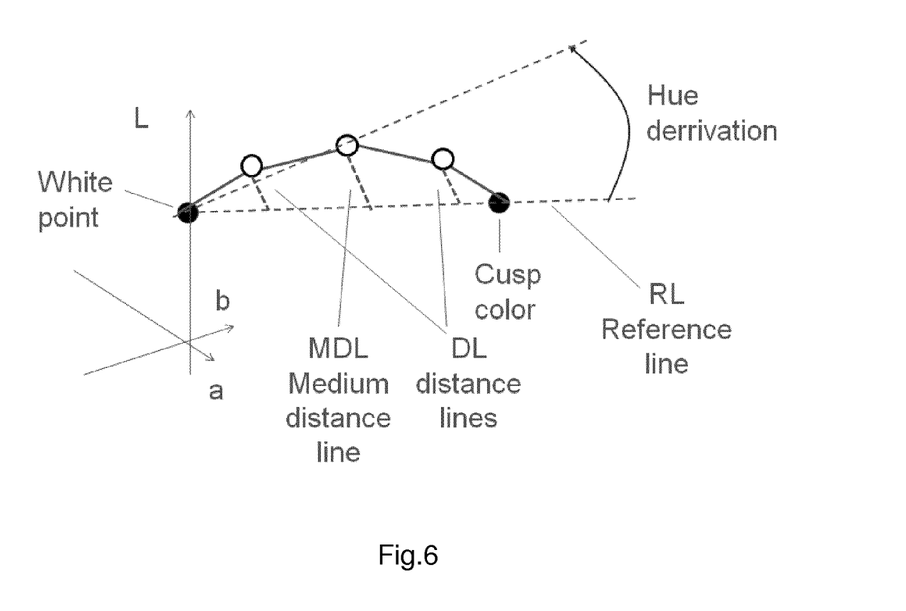
FIG. 6 illustrates how to obtain a source or target hue interval according to a variant of the embodiment illustrated on FIG. 3.

In a second variant of implementation of this first sub-step, the calculation of a surface is avoided. Instead, distance lines DL are constructed such as shown in FIG. 6. If the rim—as defined above—is described by a polygon defined by vertices, a distance DL orthogonal to the reference line RL as defined above is defined between each of these vertices and this reference line RL. In order to avoid the surface calculation, a distance MDL having the median length over all distances DL is taken as the high-lightness source hue interval at the position of the secondary color.

In the three embodiments of the first sub-step above, the high-lightness source hue interval that is obtained is representative of the curvature of the Lab color space in hue direction at the position of this secondary color. More precisely, this hue interval represents the curvature of the high lightness curved rim linking this secondary color to the white point, wherein the corresponding high lightness rim is straight in the RGB space. It is assumed that such a hue derivation of colors on this rim will influence also hue derivation of other colors having similar hues and high lightnesses within the source color gamut, however these latter hue derivations are difficult to evaluate directly.

Similarly to the first sub-step above including its variants, in a second sub-step, for each of the source cusp colors that are primary colors, i.e. located at the intersection of a low-lightness rim with the cusp line, a low-lightness source hue interval is defined using the same process as above, but in which the black point is taken in the computing methods above instead of the white point, resulting in a low-lightness hue interval for each cusp color. This low-lightness source hue interval is representative of the curvature in hue direction of the Lab color space at the position of this primary color. More precisely, this hue interval represents the curvature of the low lightness curved rim linking this primary color to the black point, wherein the corresponding low lightness rim is straight in the RGB space. It is assumed that such a hue derivation of colors on the low-lightness rim will influence also hue derivation of other colors having similar hues and low lightnesses within the source color gamut.

In a third sub-step, for each of the cusp colors that are not equal to a secondary color, a high-lightness hue interval $\Delta h_{high}^{SOURCE}$ is interpolated from the high-lightness hue intervals associated with the nearest two secondary colors as defined in the first sub-step above—such nearest distance being measured along the cusp line—and for each of the cusp colors that not are equal to a primary color, a low-lightness hue interval $\Delta h_{low}^{SOURCE}$ is interpolated from the low-lightness hue intervals associated with the nearest two primary colors as defined in the second sub-step above, such nearest distance being measured along the cusp line. The interpolation is based on two distances evaluated along the cusp line between this cusp color on one side and each of the two nearest primary or secondary colors on the other side. This interpolation can by simply linear over these distances, or can be quadratic for instance. Other known interpolation techniques may be used, as for instance splines interpolation.

For cusp colors that are not vertices of the polygon formed by the series of cusp colors, the associated hue interval is interpolated from the nearest neighboring vertex cusp colors.

In a fourth sub-step, the source hue interval $\Delta h^{SOURCE}$ associated with a cusp color—which is not a secondary or a primary color—is then calculated from the high-lightness $\Delta h_{high}^{SOURCE}$ and the low-lightness $\Delta h_{low}^{SOURCE}$ source hue intervals provided by the third sub-step above in a way that $\Delta h^{SOURCE}$ is closer to the high-lightness hue interval $\Delta h_{high}^{SOURCE}$ for source colors to map having a lightness above a lower limit $L_{high}(C)$ and closer to the low-lightness hue interval $\Delta h_{low}^{SOURCE}$ for source colors to map having a lightness below a higher limit $L_{low}(C)$. For source colors to map having a lightness comprised between the higher limit $L_{low}(C)$ and the lower limit $L_{high}(C)$, the source hue interval $\Delta h^{SOURCE}$ is interpolated from both the low-lightness hue interval $\Delta h_{low}^{SOURCE}$ and the high-lightness hue interval $\Delta h_{high}^{SOURCE}$ In reference to FIG. 8, an example of calculation will be given in the third step below where the source hue interval $\Delta h^{SOURCE}$ also depends on the lightness L and on the chroma C of the source color to map. This interpolated source hue interval $\Delta h^{SOURCE}$ associated with a source cusp color having the same hue as the source color to map lying in the source color gamut is considered as representative of the curvature of the mapping color space in hue-direction at the position of this source color.

A method to calculate the target hue interval $\Delta h^{TARGET}$ associated with a target cusp color will now be described. This method uses similarly four sub-steps as described above. A target hue interval $\Delta h^{TARGET}$ associated with this target cusp color is then similarly calculated from a high-lightness target hue interval $\Delta h_{high}^{TARGET}$ and a low-lightness target hue interval $\Delta h_{low}^{TARGET}$, which are themselves calculated similarly in reference to the primary colors, the secondary colors, the white point and the black point of the target color gamut (instead of those of the source color gamut as above). Similarly, an example of calculation will be given in the third step below where the target hue interval $\Delta h^{TARGET}$ also depends on the lightness L and the chroma C of the source color to map. An interpolated target hue interval $\Delta h^{TARGET}$ associated with a target cusp color having the same hue as the source colors to map is considered as representative of the curvature of the mapping color space in hue-direction at the position of colors lying in the target color gamut and having the same hue as the source color. Variant of the Second Step in which the Target and Source Hue Intervals are not Representative of the Curvature of the Lab Color Space:

Instead of implementing the first to fourth sub-steps above to calculate the target and source hue interval, an alternative simpler calculation method can be implemented in which the source hue interval $\Delta h^{SOURCE}$ associated with a source cusp color is defined to be the hue angle between this source cusp color and at least one closest source cusp color on the source cusp line and the target hue interval $\Delta h^{TARGET}$ associated with a target cusp color is defined to be the hue angle between this target cusp color and at least one closest target cusp color on the target cusp line. Preferably, the source hue interval is defined to be the hue angle between two nearest neighboring source cusp colors surrounding this source cusp color and the target hue interval associated with a target cusp color is defined to be the hue angle between the two nearest neighboring target cusp colors surrounding this target cusp color.

For example, if the cusp line is represented by a polygon defined by vertices, the implementation can be as follows. When the intersection of this cusp line with a constant-hue leaf corresponds to a vertex of the polygon, at least one neighboring vertex of this cusp color—i.e. said intersection—is identified. The hue interval will be then the hue angle between these two vertices. When the intersection of this cusp line with a constant-hue leaf does not correspond to a vertex of the polygon, the hue interval is interpolated from the two vertices of the polygon that are the nearest from this intersection. More precisely, the hue interval will be half of the hue angle between these two vertices. The same process is applied for the source hue interval $\Delta h^{SOURCE}$ associated with a source cusp color and for the target hue interval $\Delta h^{TARGET}$ associated with a target cusp color.

Figure 7:
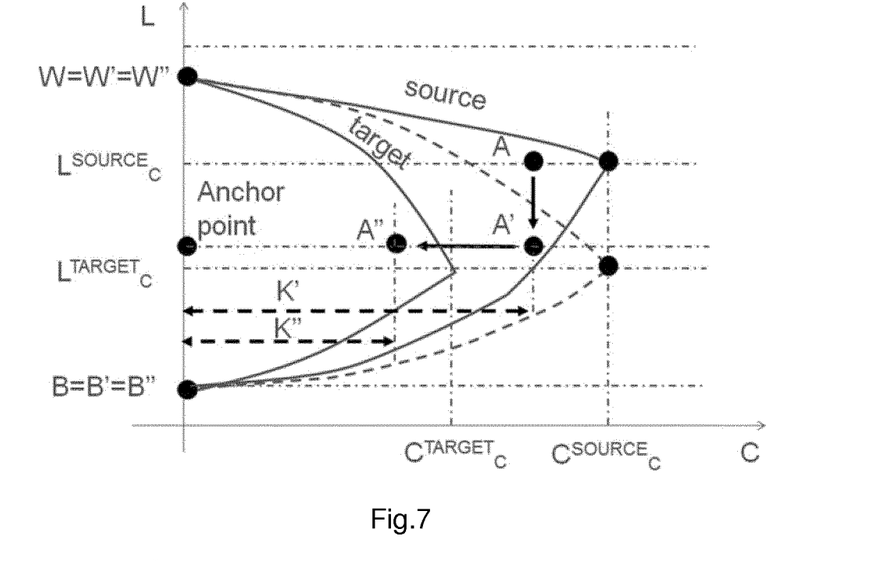
FIG. 7 shows the application of the color mapping of different source colors a same constant-hue leaf from a source color gamut towards a target color gamut according to the embodiment illustrated on FIG. 2.

$3^{rd}$ Step: Definition of Lightness Mapping Function:

Once the cusp colors of the source gamut and of the target gamut are detected at the first step above as well once their associated high-lightness and low-lightness hue intervals are calculated at the second step above, a lightness gamut mapping function f can be defined for each leaf of constant hue h in the source color gamut, for instance as described in the article entitled "Motion Picture Versioning by Gamut Mapping" by J. Stauder et al., published in November 2010 in the Eighteenth Color and Imaging Conference: Color Science and Engineering Systems, Technologies, and Applications, San Antonio, Tex., p. 178-183. A variation of the method described in this article is described below. The lightness mapping function f of a constant-hue leaf to be defined to map the lightness L of any source color of this leaf preferably satisfies the following so-called "cusp lightness condition": a source color having the lightness $L_C^{SOURCE}$ and the chroma $C_C^{SOURCE}$ of the cusp color of the source color gamut belonging to this leaf is lightness mapped in this leaf into a color having the same lightness $L_C^{TARGET}$ as the cusp color of the target color gamut belonging to this leaf. It means that, in this leaf, the function f is defined such that $f(C_C^{SOURCE}, L_C^{SOURCE}) = L_C^{TARGET}$ This condition is illustrated on FIG. 7. Taking this cusp lightness condition into consideration, the lightness mapping function f is then for instance defined according to the following equation:

$$f(C,L) = L + s \qquad (\text{Eq. 1}),$$

where the linear lightness offset s is defined as follows:

$$s = tu(L_C^{TARGET} - L_C^{SOURCE}) \qquad (\text{Eq. 2})$$

where the linear lightness weight t and the linear chroma weight u are defined as follows:

$$t = \begin{cases} \dfrac{L - L_B^{SOURCE}}{L_C^{SOURCE} - L_B^{SOURCE}} & \text{if } L \leq L_C^{SOURCE} \\ \dfrac{L_W^{SOURCE} - L}{L_W^{SOURCE} - L_C^{SOURCE}} & \text{if } L > L_C^{SOURCE} \end{cases} \qquad (\text{Eq.3A})$$

$$u = \dfrac{C}{C_C^{SOURCE}} \qquad (\text{Eq.3B})$$

where, as already defined above, $L_C^{SOURCE}$ and $C_C^{SOURCE}$ are respectively the lightness and the chroma of the source cusp color of this constant-hue leaf in which the mapping function f is defined. The chroma weight u as defined in equation 3B ensures that colors with small chroma values are less lightness mapped than colors with large chroma values. In this way, grey ramps near the L-axis are preserved.

$\check{L}_C^{SOURCE}$ is an averaged source cusp color lightness value defined by an average of lightness values over source cusp colors found in step 1 above that are within a hue window $\pm(1-t)\Delta h$ around the cusp color of the leaf of constant hue h; such an average is then defined as follows:

$$\check{L}_C^{SOURCE} = \frac{1}{2(1-t)\Delta h^{SOURCE}} \int_{h-(1-t)\Delta h^{SOURCE}}^{h+(1-t)\Delta h^{SOURCE}} L_C^{SOURCE}(v) dv \quad (\text{Eq.4})$$

where $L_C^{SOURCE}(v)$ is the lightness of the cusp color of the source color gamut having a hue v,
where h is the hue value common to all source colors of the constant-hue leaf to which the lightness function is to be applied,
where $\Delta h^{SOURCE}$ is the source hue interval associated with the source cusp color of the leaf of constant hue h, which is calculated from equations 5 to 7 below from the high-lightness $\Delta h_{high}^{SOURCE}$ and the low-lightness $\Delta h_{low}^{SOURCE}$ hue intervals of the source cusp color as defined in step 2 above:

$$L_{high}^{SOURCE}(C) = L_W^{SOURCE}(L_C^{SOURCE}/L_W^{SOURCE})^{C/C_C^{SOURCE}} \quad (\text{Eq. 5})$$

$$L_{low}^{SOURCE}(C) = L_B^{SOURCE}(L_C^{SOURCE}/L_B^{SOURCE})^{C/C_C^{SOURCE}} \quad (\text{Eq. 6})$$

$$\Delta h^{SOURCE} = \begin{cases} \Delta h_{high}^{SOURCE} & L > L_{high}^{SOURCE}(C) \\ \Delta h_{low}^{SOURCE} & L < L_{low}^{SOURCE}(C) \\ \frac{(L_{high}^{SOURCE}(C) - L)\Delta h_{low}^{SOURCE} + (L - L_{low}^{SOURCE}(C))\Delta h_{high}^{SOURCE}}{L_{high}^{SOURCE}(C) - L_{low}^{SOURCE}(C)} & \text{else} \end{cases} \quad (\text{Eq. 7})$$

Figure 8:
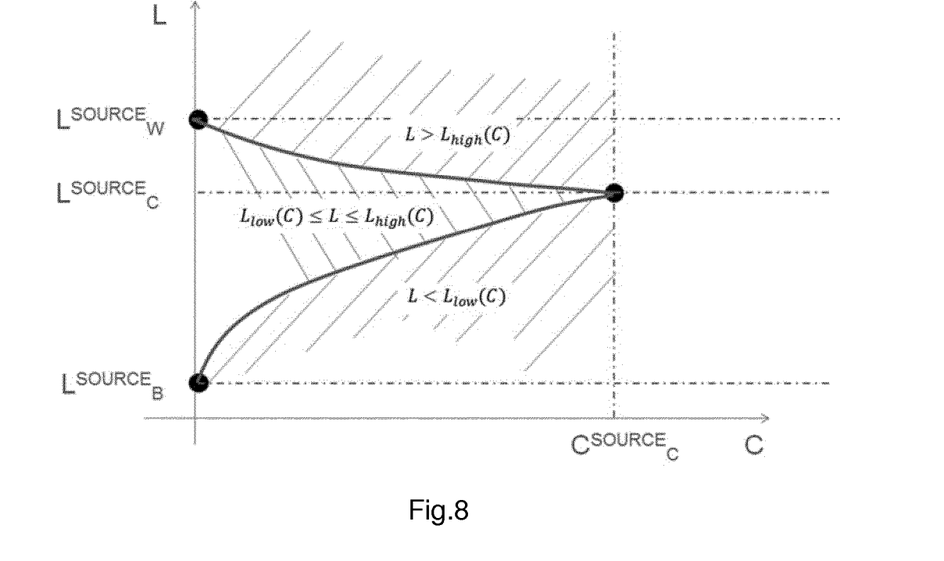
FIG. 8 illustrates the variation of a higher limit $L_{low}(C)$ of low lightness values and of a lower limit $L_{high}(C)$ of high lightness values used for the calculation of the source and target hue interval as illustrated on FIG. 5.

As illustrated on FIG. 8, the lower limit $L_{high}(C)$ of the high lightness values and the higher limit $L_{low}(C)$ of the low lightness values to consider for the calculation of $\Delta h^{SOURCE}$ depends on the chroma C of the source color to map. Therefore, $\Delta h^{SOURCE}$ depends on this chroma too.

According to a variant, when the above simpler method of calculation of a source hue interval $\Delta h^{SOURCE}$ associated with a source cusp color is implemented (where the source hue interval is not representative of the curvature of the Lab color space—see above at the end of paragraph describing the 2$^{nd}$ step), the averaged source cusp color lightness value $\check{L}_C^{SOURCE}$ can be advantageously calculated according to:

$$\check{L}_C^{SOURCE} = \frac{1}{2\Delta h^{SOURCE}} \int_{h-\Delta h^{SOURCE}}^{h+\Delta h^{SOURCE}} L_C^{SOURCE}(v) dv \quad (\text{Eq. 4A})$$

In this implementation, for cusp colors lying on a vertex of the polygon representing the source cusp line, the integration of $L_C^{SOURCE}(v)$ in Eq. 4A can be advantageously simplified into averaging the lightness value of this cusp color and the lightness values of the two nearest vertices found on this source cusp line (see end of step 2 above) according to $$\check{L}_C^{SOURCE} = \frac{1}{3}[L_C^{SOURCE} + L_C^{N1} + L_C^{N2}] \quad (\text{Eq. 4B})$$

where $L_C^{N1}$; $L_C^{N2}$ are the lightness values of these two nearest vertices.

For cusp colors not lying on a vertex of the polygon representing the source cusp line, $\check{L}_C^{SOURCE}$ is obtained as follows: an averaged polygon is constructed having vertices based on averaged lightness values calculated according to Eq. 4B from cusp colors lying on a vertex of the polygon representing the source cusp line. More precisely, this averaged polygon is defined by averaged vertices having the same chroma and hue as the vertices of the polygon representing the source cusp line while the lightness of the averaged vertices is calculated according to Eq. 4B. Once this averaged polygon is constructed, an averaged source cusp color lightness value $\check{L}_C^{SOURCE}$ can be obtained for any of such cusp colors from the lightness of the color at the intersection of this averaged polygon with the constant-hue leaf comprising this cusp color.

$\check{L}_C^{TARGET}$ is an averaged target cusp color lightness value defined by an average of lightness values over target cusp colors found in step 1 above that are within the same hue window $\pm(1-t)\Delta h$ around the cusp color of the leaf of constant hue h; such an average is then defined as follows:

$$\check{L}_C^{TARGET} = \frac{1}{2(1-t)\Delta h^{TARGET}} \int_{h-(1-t)\Delta h^{TARGET}}^{h+(1-t)\Delta h^{TARGET}} L_C^{TARGET}(v) dv \quad (\text{Eq.8})$$

where $L_C^{TARGET}(v)$ is the lightness of a cusp color of the target color gamut having a hue v,
where h is the hue value common to all colors of the constant-hue leaf,
where $\Delta h^{TARGET}$ is the target hue interval associated with the target cusp color of the leaf of constant hue h, which is calculated according to equations 9 to 11 below from the high-lightness $\Delta h_{high}^{TARGET}$ and the low-lightness $\Delta h_{low}^{TARGET}$ target hue intervals of the target cusp color as defined in step 2 above:

$$L_{high}^{TARGET}(C) = L_W^{TARGET}(L_C^{TARGET}/L_W^{TARGET})^{C/C_C^{TARGET}} \quad (\text{Eq. 9})$$

$$L_{low}^{TARGET}(C) = L_B^{TARGET}(L_C^{TARGET}/L_B^{TARGET})^{C/C_C^{TARGET}} \quad (\text{Eq. 10})$$

$$\Delta h^{TARGET} = \begin{cases} \Delta h_{high}^{SOURCE} & L > L_{high}^{TARGET}(C) \\ \Delta h_{low}^{SOURCE} & L < L_{low}^{TARGET}(C) \\ \dfrac{(L_{high}^{TARGET}(C) - L)\Delta h_{low}^{TARGET} + (L - L_{low}^{TARGET}(C))\Delta h_{high}^{TARGET}}{L_{high}^{TARGET}(C) - L_{low}^{TARGET}(C)} & \text{else} \end{cases} \quad \text{(Eq. 11)}$$

According to a variant, when the above simpler method of calculation of a target hue interval $\Delta h^{TARGET}$ associated with a target cups color is implemented (where the target hue interval is not representative of the curvature of the Lab color space—see above at the end of paragraph describing the $2^{nd}$ step), the averaged target cusp color lightness value $\check{L}_C^{TARGET}$ can be advantageously calculated according to:

$$\check{L}_C^{TARGET} = \frac{1}{2\Delta h^{TARGET}} \int_{h-\Delta h^{TARGET}}^{h+\Delta h^{TARGET}} L_C^{TARGET}(v) dv \quad \text{(Eq. 8A)}$$

In this implementation, for cusp colors lying on a vertex of the polygon representing the target cusp line, the integration of $L_C^{TARGET}(v)$ in Eq. 8A can be advantageously simplified into averaging the lightness value of this cusp color and the lightness values of the two nearest vertices found on this target cusp line (see end of step 2 above) according to $$\check{L}_C^{TARGET} = \frac{1}{3}[L_C^{TARGET} + L_C^{M1} + L_C^{M2}] \quad \text{(Eq. 8B)}$$

where $L_C^{M1}$; $L_C^{M2}$ are the lightness values of these two nearest vertices.

For cusp colors not lying on a vertex of the polygon representing the source cusp line, $\check{L}_C^{TARGET}$ is obtained as follows: an averaged polygon is constructed having vertices based on averaged lightness values calculated according to Eq. 8B from cusp colors lying on a vertex of the polygon representing the target cusp line. More precisely, this averaged polygon is defined by averaged vertices having the same chroma and hue as the vertices of the polygon representing the target cusp line while the lightness of the averaged vertices is calculated according to Eq. 8B. Once this averaged polygon is constructed, an averaged target cusp color lightness value $\check{L}_C^{TARGET}$ can be obtained for any of such cusp colors from the lightness of the color at the intersection of this averaged polygon with the constant-hue leaf comprising this cusp color.

The above non-limiting definition of the lightness-mapping function satisfies the cusp lightness condition above.

In Equations 4 and 8 above, the size of the averaging hue window is modulated by the same factor (1−t) based on the parameter t defined above. Note that the integrals of these equations are generally replaced in practice by a sum over a finite number of points of the cusp polygon.

According to the above different definitions of the averaged cusp color lightness values $\check{L}_C^{SOURCE}$; $\check{L}_C^{TARGET}$ used for the definition of a lightness-mapping function f to be applied to all source colors of a constant-hue leaf, lightnesses of source and target cusp colors located out of this constant-hue leaf are taken into account. It means that the definition of the lightness function f contains lightness information from source or target cusp colors with hues that are different from the hue h of the source colors to map.

According to the above more specific definitions of source and target hue intervals that are representative of the curvature of the Lab color space in hue direction, lightnesses of source and target cusp colors that are within these intervals centered on the source and target cusp color defining a constant-hue leaf of hue h are taken into consideration for the definition of the lightness function f to be applied to all source colors of this hue leaf. In the embodiment given above, these lightnesses are averaged over these hue intervals. It means that the definition of the lightness function f contains lightness information from source or target cusp colors with hues that are distributed over hue intervals that are representative of the curvature of the Lab color space in hue direction, these hues being also different from the hue h of the source colors to map.

In a variation, the chroma value $C_C^{SOURCE}$ in Eq. 3B could be replaced by an averaged chroma value in the same way as the lightness is averaged in Eq. 4.

A specific lightness gamut mapping function can be defined as described above for each constant-hue leaf of the Lab color space in which there are source colors to map. At the end of this third step, a whole definition of the lightness mapping is obtained.

When source and target hue intervals are defined such that they are representative of the curvature of the Lab color space in hue direction, this definition of the lightness mapping matches better than in prior art the non-linearity, i.e. the curvature, of the boundaries of the source and target color gamuts. Moreover, when the source hue interval $\Delta h^{SOURCE}$ is defined according to according to Eq. 7 and when the target hue interval $\Delta h^{TARGET}$ is defined according to Eq. 11, the hue intervals are larger and thus the averaging of the source and target lightnesses of cusp colors according to equations 4 and 8 is stronger for source colors at the gamut border than for source colors with a lightness L close to that $L_C^{SOURCE}$ of the cusp color of the leaf of constant hue h. This modulation ensures that the source colors located on the rims of the source gamut and being far away from the source cusp line are lightness mapped using information from more cusp colors having hues different from hue h than source colors located close to the source cusp line or far away from the rims. This reduces advantageously the impact of the geometrical mismatch described above. As a matter of fact, when using the above definition of a lightness mapping function, a color located on a rim of the source gamut is lightness mapped—at least partially in the sense of averaging—according to the cusp color belonging to the same rim.

As soon as they satisfy the cusp lightness condition above, other mapping functions dependent on s parameter can be used instead of the one used above ($f(C,L) = L + s$) to implement the invention, as for instance $f(C,L) = sL$ (Eq. 1'), $$\text{with } s = tu\frac{\check{L}_C^{TARGET}}{\check{L}_C^{SOURCE}} + (1 - tu). \quad \text{(Eq.2')}$$

with the same definition as above for t, u, $\check{L}_C^{SOURCE}$ and $\check{L}_C^{TARGET}$.

4th Step: Lightness Mapping by Application of the Lightness Mapping Function:

The lightness mapping function $f(C,L)$ as defined above is then applied to the lightness of the source colors of the content to map, each color being represented in the mapping color space Lab by the following coordinates:

$$N = \begin{pmatrix} L \\ a \\ b \end{pmatrix}.$$

According to the invention, the lightness mapping function f is applied only to the L coordinate such that the resulting, mapped color has the coordinates $$N' = \begin{pmatrix} L' = f(C, L) \\ a' = a \\ b' = b \end{pmatrix} \text{ with } C = \sqrt{a^2 + b^2}.$$

FIG. 7 shows an example of application of the lightness mapping function f in a constant-hue leaf LC in case of source and target gamuts having same white points W, W', W" and same black points B, B', B". A source color A having the same lightness as the source cusp color of this leaf but a smaller chroma is lightness mapped onto a target color A' according to the above defined lightness mapping function f: the position of the target color A' illustrates that the lightness is mapped in the direction of the target cusp color and that the amount of lightness mapping is controlled by the difference between the lightness of the source cusp color $L_C^{SOURCE}$ and the lightness of the target cusp color $L_C^{TARGET}$.

$5^{th}$ Step: Chroma Mapping:

The lightness mapped color N' which is obtained at the end of the previous step is an intermediate mapped color. Notably when the intermediate mapped color N' that is obtained through the previous step of lightness mapping is not located within the target color gamut, this color N' is finally chroma mapped into a target color N" in a way that this target color is inside the target color gamut.

To illustrate such a chroma mapping, an intermediate mapped color N' is chroma mapped into a target color N" in direction to a so-called anchor point $N_0$. In the specific embodiment, this anchor point is positioned on the Lightness axis and has the following coordinates:

$$N_0 = \begin{pmatrix} L_0 = L' \\ a_0 = 0 \\ b_0 = 0 \end{pmatrix}$$

and straight lines anchored on this anchor point are chosen as mapping trajectories for the chroma mapping step. In this specific case, the second mapping does not impact the lightness of the colors.

Such a chroma mapping can be described as a modification of distance K' between an intermediate mapped color N' and the anchor point $N_0$ into a distance K" between the target color N" and the same anchor point $N_0$. In reference to the previous example illustrating the lightness mapping of A into A', A' will me chroma mapped into A": see FIG. 7.

Any other known algorithms can be used for this chroma mapping, such as gamut compression, gamut clipping or gamut expansion.

For intermediate mapped colors N' located within the target color gamut, this $5^{th}$ step may be optional, notably when these intermediate mapped colors N' populate regularly the target color gamut.

As a conclusion, the implementation of the above first to fifth steps leads to a global color gamut mapping of source colors of a content to map from the source color gamut in which they are located into target colors in the target color gamut. The fourth and fifth steps above can be merged in one step of color gamut mapping impacting both the lightness and the chroma of source colors to map.

Main advantages of the color mapping method above when hue intervals are representative of the curvature of the mapping color space:

1. Curvature of color space in hue-direction is taken into account for lightness mapping.
2. This curvature of color space in hue-direction can be taken into account even if this curvature cannot not be estimated at the position of each color to map.
3. The presence of curvature of color space is taken into account so that the impact of mismatch between a generally linear propagation of the mapping over a whole constant-hue leaf and the non-plane boundaries is lowered.

According to a hardware aspect, the invention relates to an image processing device configured for mapping source colors of a content which are provided in a source color gamut having a black point and a white point into targets colors of a target color gamut, wherein said mapping is performed in a 3D non-linear gamut mapping color space that can be partitioned in 2D constant-hue leaves having axes for lightness and chroma.

This image processing device comprises:

a cusp module configured to obtain, from said source color gamut, source cusp colors forming a polygon describing a source cusp line and, from said target color gamut, target cusp colors forming a polygon describing a target cusp line, a hue interval module configured to obtain, for any leaf of constant hue in which there is at least one source color to map, a source hue interval around the hue h of this leaf associated with the source cusp color of this leaf provided by said cusp module, which reflects the curvature of the Lab color space in a hue-direction of colors lying in this leaf, and a target hue interval around the hue h of said leaf, associated with the target cusp color of this leaf provided by said cusp module, which reflects the curvature of the Lab color space in a hue-direction of colors lying in this leaf, a lightness-mapping function definition module configured to define, for source colors located in a same leaf of constant hue h, a lightness-mapping function $f(C,L)$ adapted to lightness-map any of these source colors having a chroma C and a lightness L, wherein said lightness mapping function depends not only on the source cusp color and on the target cusp color of said leaf of constant hue h but also on at least one other source cusp color and on at least one other target cusp color of constant-hue leaves different from said leaf of constant hue h, wherein hue(s) of said at least one other source cusp color are distributed over the source hue interval provided by said hue interval module, and wherein hue(s) of said at least one other target cusp color are distributed over the target hue interval provided by said hue interval module, a lightness-mapping module configured to apply the lightness-mapping function $f(C,L)$ provided by the lightness-mapping function definition module to said source colors located in said leaf of constant hue h such as to output lightness-mapped colors.

Preferably, said image processing device comprises also a chroma-mapping module configured to chroma-map said lightness-mapped colors provided by said lightness-mapping module into final-mapped colors such that they are located in said target color gamut.

The above modules are functional units that may or may not correspond to physically distinguishable units. For example, these modules or some of them can be grouped together in a single component or circuit, or constitute functions of the same software. On the contrary, some modules may be composed of separate physical entities.

This image processing device is implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

When source colors are provided in a color space different from a perceptually uniform color space as the Lab color space, these source colors are transformed in a manner known per se into a representation in a perceptually uniform color space before being mapped.

This image processing device can notably be incorporated in an electronic device such as a TV set, a set-top-box, a gateway, a tablet, a smartphone, a camera or any electronic device incorporating an image display device and/or an image capture device.

While the present invention is described with respect to a particular embodiment, it is understood that the present invention is not limited to this embodiment. The present invention as claimed therefore includes variations from this embodiment described herein, as will be apparent to one of skill in the art.

It is to be further understood that, because some of the constituent system components and methods depicted in the accompanying drawings are preferably implemented in software, the actual connections between the system components or the process function blocks may differ depending upon the manner in which the invention is implemented.

The invention claimed is:

1. Method of color gamut mapping source colors into targets colors from a source color gamut towards a target color gamut in a 3D non-linear gamut mapping color space that can be partitioned in 2D constant-hue leaves having axes for lightness and chroma, wherein a source cusp color of a constant-hue leaf is defined as a color having the highest color chroma in said constant-hue leaf and in said source color gamut, wherein a target cusp color of a constant-hue leaf is defined as a color having the highest color chroma in said constant-hue leaf and in said target color gamut, said method comprising mapping the lightness L of each source color having a chroma C into a lightness L' of a target color according to a lightness mapping function $L'=f(C,L)$ associated with the constant-hue leaf comprising said source color, wherein said lightness mapping function is defined such as to meet a cusp lightness condition according to: $f(C_C^{SOURCE}, L_C^{SOURCE})=L_C^{TARGET}$, where $L_C^{SOURCE}$ and $C_C^{SOURCE}$ are respectively the lightness and the chroma of the source cusp color of this leaf, wherein for at least one leaf of constant hue h the associated lightness mapping function depends on the lightness $L_C^{SOURCE}$ of the source cusp color of said leaf and on the lightness $L_C^{TARGET}$ of the target cusp color of said leaf and depends on the lightness of at least one other source cusp color and/or on the lightness of at least one other target cusp color of constant-hue leave(s) different from said leaf of constant hue h.

2. Method of color gamut mapping according to claim 1 wherein said associated lightness mapping function $L'=f(C, L)$ associated with the constant-hue leaf of hue h depends on a source average of lightnesses of these source cusp colors and/or on a target average of lightnesses of these target cusp colors.

3. Method of color gamut mapping according to claim 2 wherein:

source cusp colors of different constant-hue leaves form a polygon representing a source cusp line and source cusp colors of said source average include vertices of said polygon which are nearest from the intersection of said source cusp line with the leaf of constant hue h, and/or target cusp colors of different constant-hue leaves form a polygon representing a target cusp line and target cusp colors of said target average include vertices of said polygon which are nearest from the intersection of said target cusp line with the leaf of constant hue h.

4. Method of color gamut mapping according to claim 1 wherein:

hue(s) of said at least one other source cusp color are distributed over a source hue interval $[h-(1-t)\Delta h^{SOURCE}, h+(1-t)\Delta h^{SOURCE}]$, wherein h is the hue of said leaf of constant hue, wherein $\Delta h^{SOURCE}$ is a source hue interval around said constant hue h which is representative of the curvature of said mapping color space in hue direction at the position of colors of said source color gamut lying in the leaf of said constant hue h, where t is a lightness weight whose value is the range [0,1], and/or hue(s) of said at least one other target cusp color are distributed over a target hue interval $[h-(1-t)\Delta h^{TARGET}, h+(1-t)\Delta h^{TARGET}]$, where h is the hue of said leaf of constant hue, where $\Delta h^{TARGET}$ is a target hue interval around said constant hue h which is representative of the curvature of said mapping color space in hue direction at the position of colors of said target color gamut lying in the leaf of said constant hue h, where t is a lightness weight whose value is in the range [0,1].

5. Method of color gamut mapping according to claim 4 wherein said at least one lightness mapping function depends on a parameter t representative of the difference between the lightness L of the source color to map and the lightness $L_B^{SOURCE}$ of the black point of the source color gamut, or between the lightness L of the source color to map and the lightness $L_W^{SOURCE}$ of the white point of the source color gamut.

6. Method of color gamut mapping according to claim 4 wherein said at least one lightness mapping function depends on a parameter u representative of the ratio between the chroma C of the source color to map and the chroma $C_C^{SOURCE}$ of said source cusp color of the leaf of said constant hue h.

7. Image processing device comprising one or more processors, wherein the one or more processors are configured to perform mapping source colors of a content which are provided in a source color gamut having a black point and a white point into targets colors of a target color gamut, in a 3D non-linear gamut mapping color space that can be partitioned in 2D constant-hue leaves having axes for lightness and chroma, wherein the one or more processors are further configured to:

obtain, from said source color gamut, source cusp colors forming a polygon describing a source cusp line and, from said target color gamut, target cusp colors forming a polygon describing a target cusp line, obtain, for any leaf of constant hue in which there is at least one source color to map, a source hue interval around the hue h of this leaf associated with the source cusp color of this leaf, and a target hue interval around the hue h of said leaf associated with the target cusp color of this leaf, define, for source colors located in a same leaf of constant-hue h, a lightness-mapping function $f(C,L)$ adapted to lightness-map any of these source colors having a chroma C and a lightness L, wherein said lightness mapping function depends on the source cusp color and on the target cusp color of said leaf of constant-hue h and depends on at least one other source cusp color and/or on at least one other target cusp color of constant-hue leave(s) different from leaf of constant-hue h, wherein hue(s) of said at least one other source cusp color are distributed over the source hue interval, and wherein hue(s) of said at least one other target cusp color are distributed over the target hue interval, apply the lightness-mapping function $f(C,L)$ to said source colors located in said leaf of constant-hue h such as to output lightness-mapped colors.

8. Image processing device according to claim 7, wherein the one or more processors are further configured to chroma-map said lightness-mapped colors into final-mapped colors such that they are located in said target color gamut.

9. Electronic device incorporating an image processing device according to claim 7.

10. Electronic device according to claim 9 incorporating an image display device and/or an image capture device.

11. A non-transitory processor readable medium having stored therein instructions for causing a processor to perform the method of color gamut mapping according to claim 1.

* * * * *

UNITED STATES PATENT AND TRADEMARK OFFICE
CERTIFICATE OF CORRECTION

PATENT NO. : 10,602,027 B2
APPLICATION NO. : 15/739767
DATED : March 24, 2020
INVENTOR(S) : Stauder et al.

It is certified that error appears in the above-identified patent and that said Letters Patent is hereby corrected as shown below:

In the Claims

Column 21, Line 65: after "leaf," insert --where $L_C^{TARGET}$ is the lightness of the target cusp color of this leaf,--.

Signed and Sealed this
Second Day of August, 2022

Katherine Kelly Vidal
*Director of the United States Patent and Trademark Office*